United States Patent
Miller

[15] 3,663,090
[45] May 16, 1972

[54] LIGHT DEFLECTION BY EXTERNAL CONICAL REFRACTION

[72] Inventor: Wendell S. Miller, 1341 Comstock Avenue, Los Angeles, Calif. 90024

[22] Filed: July 10, 1970

[21] Appl. No.: 53,902

[52] U.S. Cl....................350/150, 350/157, 350/151
[51] Int. Cl........................................G02f 1/26
[58] Field of Search..............350/150, 151, 157, 189

[56] References Cited

UNITED STATES PATENTS

| | | | |
|---|---|---|---|
| 3,375,052 | 3/1968 | Kosanke et al. | 350/150 |
| 3,420,601 | 1/1969 | Young et al. | 350/151 |
| 1,806,935 | 5/1931 | Farnsworth | 350/151 |
| 1,958,606 | 5/1934 | Birch-Field | 350/151 |
| 3,305,292 | 2/1967 | Miller | 350/150 |
| 3,547,526 | 12/1970 | Devereux | 350/189 |

OTHER PUBLICATIONS

Born and Wolf, Principles of Optics, 2nd Ed., MacMillan Co., New York, 1964 pp. 686–690

Primary Examiner—David Schonberg
Assistant Examiner—Ronald J. Stern

[57] ABSTRACT

A system for producing continuously variable displacement either spacially or angularly of a beam of linearly polarized light of appropriate collimation as specified comprising a source of linearly polarized light, a polarization rotator and an appropriately oriented optically biaxial crystal. A novel electro-optic continuous polarization rotater is provided.

3 Claims, 4 Drawing Figures

PATENTED MAY 16 1972
3,663,090
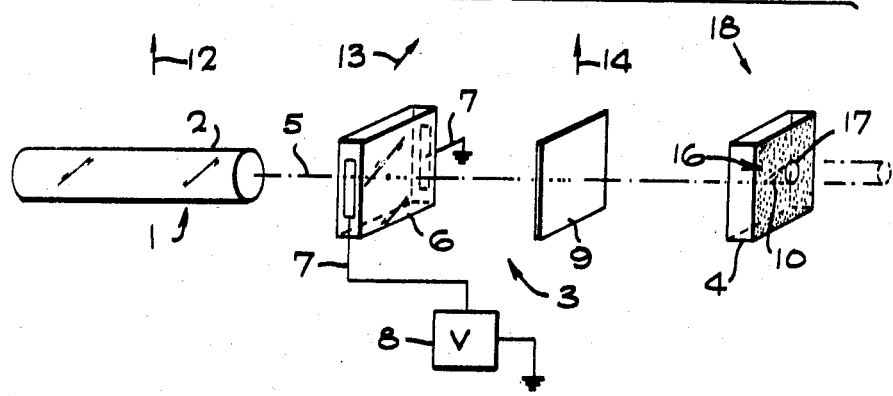
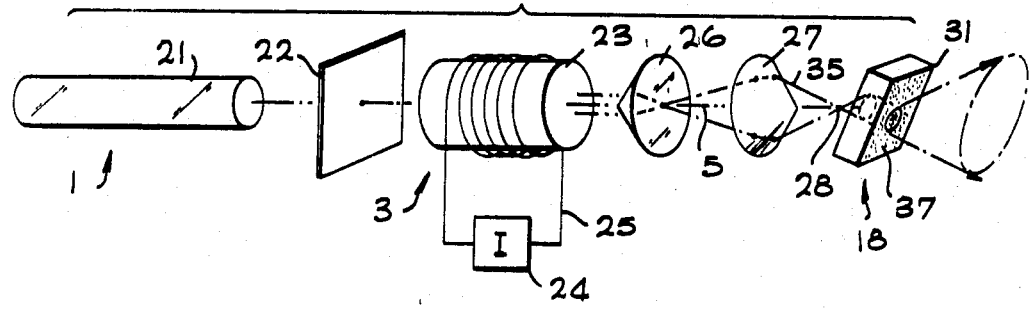
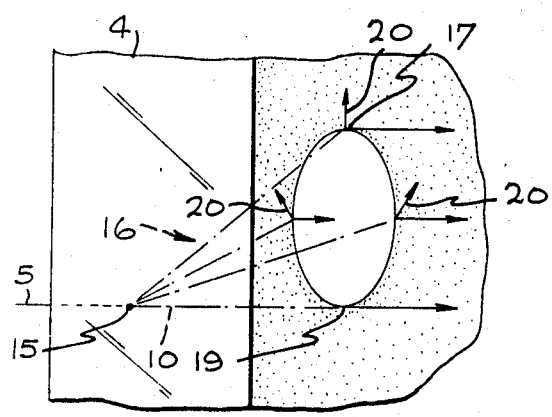
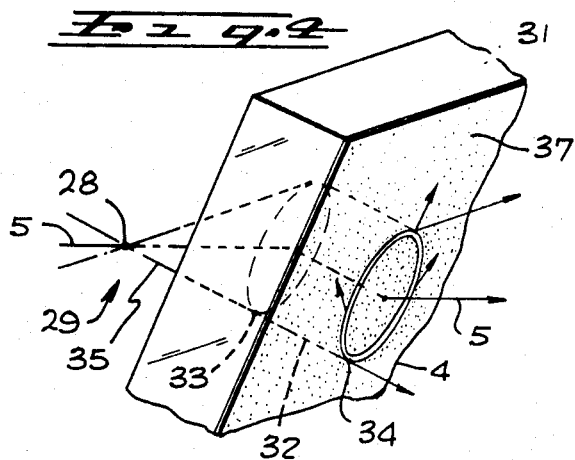
INVENTOR.
WENDELL S. MILLER

LIGHT DEFLECTION BY EXTERNAL CONICAL REFRACTION

BACKGROUND OF INVENTION

All prior art crystal optic light deflectors have either provided for light deflection through the gross variation in the refractive index of electro-optically sensitive crystals or have employed the phenomena of double refraction to obtain discreet incremental displacements in a light beam through the much more sensitive effect of phase retardation. The former effect is quite minute and thus requires a multitude of successive stages or especially high voltages to accomplish a sensible light deflection. The latter effect is limited by its discreet nature and thus requires a plurality of successive stages to obtain a substantial collection of displacement conditions.

Prior art electro-optical devices for changing the state of polarization of a polarized light beam have fallen into two categories. The first, utilizing phase retardation, include Kerr and Pockles cells. These in general change linearly polarized light into elliptically polarized light and obtain an apparent 90° rotation in the plane of polarized light through an essentially polar traverse of the Poincare sphere. The second class of electro-optic devices include Faraday cells and achieve a continuous rotation in the plane of polarized light by an essentially equatorially traverse of the Poincare sphere. Cells of the first class used alone are thus restricted to a 90° polarization rotation. Faraday cells on the other hand have been notoriously clumsy in that the degree of rotation obtainable with conventional materials and reasonable currents is only marginally in the practical range.

SUMMARY OF THE INVENTION

In view of the limitations of the prior art as noted above, it is an object of this invention to provide an electro-optic light deflection apparatus adapted to the continuous displacement of a beam of collimated polarized light. It is a further object of this invention to provide that such deflection shall be either in the spatial or angular mode.

It is a further object to provide a crystal light deflector employing optically biaxial crystals.

It is a further object of this invention to provide a method of deflecting a linearly polarized collimated beam of light by the use of biaxial birefringent crystals.

It is a further object to provide a continuous linearly polarized light rotator utilizing the electro-optic effect of Kerr or Pockels.

It is a further object of this invention to provide a means of rotating the plane of polarization in polarized light through the application of an electric field and without mechanical motion of any component.

One form of the invention employs the phenomena of internal conical refraction. In this form the device comprises a source of linearly polarized collimated light, an electro-optic continuous polarization plane rotator either of the conventional Faraday cell variety or of the novel retardation cell variety disclosed herein, and an optically biaxial crystal so disposed to the axis of light propagation as to refract the wave normal of the incident beam parallel to the primary optic axis of the crystal. In the second form of the invention there is provided a source of plane polarized light, a similar plane polarization rotator, a cone forming focusing optical element and an optically biaxial crystal disposed with respect to the cone of light so provided so as to direct the direction of ray propagation of the light so provided along the secondary or ray optic axis of the crystal to provide the phenomenon of external conical refraction, and further a light obstructing shield to permit the passage of light from the crystal only in the cone of external conical refraction.

BRIEF DESCRIPTION OF THE DRAWINGS

Embodiments of the present invention are shown in the accompanying drawings herein.

FIG. 1 is a schematic drawing of a first form of the invention employing internal conical refraction;

FIG. 2 is a fragmentary schematic diagram of the path of light rays within the optical biaxial crystal exhibiting the state of polarization of the refracted rays;

FIG. 3 is a schematic representation of a second form of the invention employing external conical refraction;

FIG. 4 is a fragmentary diagram of the path of light rays through the crystal of the FIG. 3 form exhibiting the directions of the light rays and their states of polarization.

DETAILED DESCRIPTION

In FIG. 1 there is represented at 1 a source of linearly polarized collimated light such as a laser 2 having a linear polarization mode establishing characteristic such as Brewster angle windows or a preferential optical axis as in crystal lasers. Laser 2 projects a small collimated beam along axis 5 sequentially through polarization rotater 3 and optically biaxial deflection crystal 18. In the preferred mode, electro-optic continuous polarization rotater 3 comprises a retardation cell 6 such as a Kerr or Pockles cell provided with appropriate potential leads 7 here shown disposed transversely to the direction propagation as the light beam. The potential leads 7 are in turn supplied with potential from a variable voltage source 8 able to be controlled as may be desired. As exhibited the electrode leads 7 are disposed transversely of the direction of propagation as is appropriate to a Kerr cell or to a Pockles cell employing crystals of certain optical classes. Should the symmetry of the crystal of the Pockles cell so require it the electrodes may be disposed from the faces normal to the direction of propagation as is well known in the art. The light propagated on axis 5 then passes through a retardation element 9 such as a mica plate or Fresnel rhomb. A mutual orientation of the plane of polarization of light delivered from element 1, the retardation axis of cell 6 and the retardation axis of element 9, together with the degree of retardation of this element when taken together, are critical although there is a wide and complete variation available to the individual parameters.

The light directed along axis 5 is now allowed to fall upon the crystal light deflecting means 18 comprising biaxial crystal 4 at such an angle as to direct the wave normal of the beam along the primary optic axis 10 of the crystal 4. The beam incident upon the crystal point 15 on its first fact will then be propagated through the crystal along a generator of the cone 16 to emerge from the second face at some point along the base 17 of the cone determined by the state of polarization. The thickness of the crystal 4 in the direction of the axis 5 should be so proportioned to the size of the cross-section of the beam upon entering the crystal as to permit a complete separation of the refracted ray bundles to prevent mutual interference and to achieve a useful spacial separation of the deflected beam.

The operation of this form of the invention will be described with reference to a preferred set of parameters for the orientation of the plane of polarization of the light from the laser 2 and the retardation axis of the cell 6 and the retardation element 9. Vectors 12, 13 and 14 respectively represent the traces in the direction of propagation of the light beam 5 of the plane of electrical vibration of the light beam 5, the axis of retardation of the cell 6 and the axis of retardation of the retarding element 9. It is seen that in the preferred form, the traces 12 and 14 are parallel to one another and the trace 13 is disposed at a 45° angle to 12 and 14. This requires that the light beam 5 is decomposed on entering the element 6 into two mutually perpendicular plane polarized components at A and B of equal amplitude and of initially equal phase, A being polarized along the direction of Vector 13 and B being polarized perpendicular thereto. Upon passage through cell 6 a retardation of one of these two components with respect to each other occurs by an amount equal to 2δ. The magnitude of δ is of course determined by the magnitude of the potential supplied by potential source 8 to the electrical leads 7. The orientation of the traces is represented by 12 and 13. The appropriate orientation for the retardation axis of element 9 is as shown at 14 and the amount of retardation there required to resolve the eliptically polarized light emergent from element 6 into a linearly polarized beam is 90°. This retardation will bring back into phase coincidence the two displaced components of the eliptically polarized beam emergent from element 6 and will cause them to appear with relative magnitudes sine δ and cosine δ respectively. The resultant beam thus appears as a plane polarized beam rotated through an angle δ with respect to its original orientation. This beam is now caused to fall on crystal 4 at point 15 with its plane of electric vibration determined. The beam at that point enters the crystal, preferably normally, but in any event at such angle as to cause the propagation of the wave normal along the direction of the primary optical axis 10 of the crystal 4. Depending upon the state of polarization determined by the preceding elements the beam is now refracted so that the energy passes along a generator of the cone 16 dependent upon the plane of polarization. As illustrated in FIG. 2 the path of propagation may be determined by describing on the exit fact of the crystal 4 a curve 17 tracing the base of the cone of internal conical refraction tangent to the projection of point 15 along the primary optic axis 10 of the crystal and substantially centered upon the secondary or ray optical axis of the crystal. The curve 17 is known to be very nearly a circle. If the point of tangency of the curve 17 to the optic axis 10 is designated 19 and secants 20 from point 19 through the curve 17 are drawn, these secants will each at the point of contact represent the direction of vibration of the electric vector of the light beam emergent at that point from the curve 17. The point of emergence of the beam may thus be selected by selecting the angle of orientation and polarization of the incidence light beam by control of the voltage applied by element 8. The use of initially polarized light produces a single deflectable spot rather than the continuous ring of light customarily observed with conical refraction of unpolarized radiation. With sufficiently precise collimation, there further may appear the phenomenon of biturcation of the deflected spot due I believe to the inability of the Fresnel wave equations to be satisfied for light propagated along the plane of the optic axes of a biaxial crystal.

A second form of the invention is illustrated in FIG. 3. In this form, the generator of collimated polarized light 1 is illustrated as comprised of a collimated incoherent light generator 21 of any of the well known forms, together with a polarizing element 22 which may be either a Nicol prism or a pleochroic polarizing sheet such as Polaroid. This lineally polarized beam is projected along an axis 5 as in the first form of the invention and through a polarization plane rotater of a generalized electro-optic type. Here the device is represented by a Faraday cell such as a transparent rod 23 of material having a high verdet constant such as Flint glass. Around this rod 23 is a coil 25 carrying a current from a controlled current source 24 adapted to produce a controlled amount of circular birefringence in the rod 23 to rotate the plane of polarization of the light passing through. This beam with its plane of polarization appropriately oriented is converted into an angularly hollow convergent cone of collimated beams by an appropriate optical technique. Here there is shown a technique involving the use of two conical optical elements of the type customarily referred to as axicons. The beam incident symmetrically upon the apex of the first axicon 26 is converted into a divergent cone of light which intersects the second or conical face of the second axicon 27 at a point remote from its vertex. The second axicon has a greater convergent power than the first and thus results in the convergence of the cone to a substantial focus at point 28. This apex point 28 may be on the crystal surface 31 but with light of high intensity and high focal capability, I prefer to relieve the energy flux density on the surface 31 of the crystal by separating the point 28 slightly from that surface. The crystal light deflection means 18 of this form of the invention comprises the biaxial crystal 18 itself and an opaque light shield 37 on the second or exit face of the crystal 31. Shield 37 is adapted to intercept and remove the portions of light in the original incident beam which are not properly oriented by the axicon elements 26 and 27 to undergo external conical refraction for the plane of polarization imparted to them by the rotater 3.

In FIG. 4 the behavior of the light in the vicinity of the biaxial crystal element 18 is shown with greater detail. The incident light is shown as a cone 29 centered on the initial axis of propagation 5 with apex at point of focus of the second axicon 28, and incident on the first face 31 of crystal 18 in a substantially eliptical trace 33. The apical angle of the cone 29 and the inclination of the crystal 31 to the initial axis of propagation 5 is chosen with regard to the criteria in the classic work of William Hamilton (1833) on external conical reflection. Each of the angles of inclination permitted by the generators of the cone 29 to the crystal 31 is capable for some polarization orientation in FIG. 4 of being refracted as a ray parallel to the secondary or ray optic axis 32 of the crystal 18. These rays are then propagated through the crystal 31 along the generators of a cylinder parallel to the secondary optic axis 32. This cylinder will of course degenerate to the line if the apex point 28 is allowed to contact the surface of the crystal 31. At the second or exit face of the crystal 18 the rays that have been transmitted along the generators of this cylinder are again refracted into a direction parallel to their initial direction of incidence upon the crystal face 31. The point of emergence of such rays may be determined by a construction similar to that followed in the first form of the invention. Through the Point 34 which is the point of emergence of the ray having a polarization with the direction of vibration of the electric vector parallel to the tangent to the trace 33 of the cone of incident light, secants may be drawn to various parts of the trace of the emergent rays on the second face 31 of crystal 4. Light having its direction of electric vibration along these secants will emerge at this second face at the intersection of the secants and the trace as described. Other rays of light in the incident cone 29 will have their direction of inclination incorrectly oriented for their polarization and will not be transmitted through the crystal so as to emerge in the prescribed trace. These rays will be intercepted by the opaque shield 37.

Crystals suitable for use in this device include Aragonite and Orthorhombic Sulfur, the latter being useful in the infra red and distinguished by its unusually high angles of conical refraction. Other biaxial crystals may be employed subject to the criterion that the difference in the values of the least and intermediate principal refractive indices and between the intermediate and greatest principal refractive indices shall both be substantial. Preferably greater than one part in the second decimal place. The customary mechanical and stability criteria together with that of transparency and freedom from optical activity must also be observed. The obscuring element 37 in FIG. 3 may be dispensed with if the use to which the deflected beam is to be put will not be interfered with by the presence of some other extraneous beams not on the prescribed cone of external conical refraction.

In the FIG. 1 form of the device either a Kerr or Pockles cell (either of which may properly be described as am electro-optic phase retardation cell) may be employed for element 6. I prefer to use a Pockles cell because of the linearity of response with voltage which greatly facilitates the positioning of the deflected beam. Additionally, I lump together in the generalized term, electro-optic continuous polarization rotater, the variable plus fixed retardation arrangement of FIG. 1 and the Faraday cell of FIG. 3. Further, while a specific form of light cone producing optics is disclosed in the FIG. 3 form, I do not mean to exclude from consideration the less efficient but older technique employed using a convergent lens and baffle and a shield with pinhole on the face 31 of the crystal.

I claim:

1. A crystal light deflector comprising a source of plane polarized, collimated light which directs said light along a first axis, a controled source of electric energy, an electro-optic continuous polarization rotator aligned with said axis and controlled by said source of electrical energy to rotate the plane of polarization of said plane polarized light through a range of angular positions, convergent optical means to produce from said collimated light after its emergence from said electro-optic continuous polarization rotator a cone of light having an apex, a biaxial birefringent crystal positioned in the path of said light, said crystal being oriented such that the refractive path of light is directed along a generator of said cone for the development of external conical refraction therein, whereby the emission of light therefrom is in a direction determined by the control of said source of electrical energy.

2. A crystal light deflector as set forth in claim 1, further comprising an opaque shield provided with an opening therein, said opening positioned proximate the exit face of said crystal and in the path of rays of said cone externally conically refracted in said crystal.

3. A crystal light deflector as set forth in claim 1, wherein said plane polarized light has its plane of polarization oriented in a first direction and wherein said electro-optic continuous polarization rotator comprises an electro-optic phase retardation cell, said cell having its retardation axis oriented at 45° to said first direction and a quarter-wave fixed retardation element having its retardation axis parallel to said first direction, said retardation elements being aligned for the passage of light sequentially therethrough.

* * * * *